United States Patent [19]

Blee et al.

[11] Patent Number: 4,737,913
[45] Date of Patent: Apr. 12, 1988

[54] AUTOMATIC SPEED CONTROL SYSTEMS

[75] Inventors: Timothy J. Blee; Michael D. Cox; Norman P. Deane; Michael Hansford, all of Rugby, England

[73] Assignee: AE PLC, Warwickshire, England

[21] Appl. No.: 759,457

[22] Filed: Jul. 26, 1985

[30] Foreign Application Priority Data

Jul. 27, 1984 [GB] United Kingdom ............... 8419237

[51] Int. Cl.⁴ .......................................... G05D 13/62
[52] U.S. Cl. .................... 364/426; 324/161; 180/179
[58] Field of Search ............... 364/424, 426, 431.07, 364/565; 180/176, 179; 123/352; 324/161, 162, 163

[56] References Cited

U.S. PATENT DOCUMENTS

| | | | |
|---|---|---|---|
| 3,398,816 | 8/1968 | Senn | 192/9 |
| 3,748,641 | 7/1973 | Hartung | 340/53 |
| 3,820,624 | 6/1974 | Sakakibara | 180/176 |
| 3,885,137 | 5/1975 | Ooya et al. | 324/162 |
| 3,949,359 | 4/1976 | Sorkin | 340/54 |
| 4,046,213 | 9/1977 | Larson | 180/177 |
| 4,132,284 | 2/1977 | Tomecek | 180/179 |
| 4,138,723 | 2/1979 | Nehmer et al. | 364/424 |
| 4,140,202 | 2/1979 | Noddings et al. | 180/105 E |
| 4,169,437 | 10/1979 | Fleischer | 123/361 |
| 4,355,607 | 10/1982 | Blaney | 123/350 |
| 4,367,805 | 1/1983 | Totani et al. | 180/179 |
| 4,380,799 | 4/1983 | Allard et al. | 364/426 |
| 4,402,376 | 9/1983 | Hayashi e al. | 364/426 |
| 4,407,385 | 10/1983 | Hilton et al. | 180/175 |
| 4,434,469 | 2/1984 | Suzuki et al. | 364/424 |
| 4,484,279 | 11/1984 | Muto | 364/426 |
| 4,495,578 | 1/1985 | Sibley et al. | 364/426 |

FOREIGN PATENT DOCUMENTS

| | | |
|---|---|---|
| 0046019 | 2/1982 | European Pat. Off. . |
| 0068713 | 1/1983 | European Pat. Off. . |
| 0096126 | 12/1983 | European Pat. Off. . |
| 2431935 | 7/1978 | France . |
| 57-52916 | 3/1982 | Japan . |
| 58-96142 | 6/1983 | Japan . |
| WO86/00049 | 1/1986 | PCT Int'l Appl. . |
| 2046478 | 11/1980 | United Kingdom . |
| 2056125 | 3/1981 | United Kingdom . |
| 2136164 | 9/1984 | United Kingdom . |

OTHER PUBLICATIONS

Patents Abstracts of Japan, vol. 7, No. 197 (M-239) (1342), Aug. 27, 1983.
Patents Abstracts of Japan, vol. 6, No. 125 (P-127) (1003).

*Primary Examiner*—Errol A. Krass
*Assistant Examiner*—Thomas G. Black
*Attorney, Agent, or Firm*—Leydig, Voit & Mayer

[57] ABSTRACT

A vehicle speed control system comprises a memory which stores a signal Vr representing desired road speed which is compared in a comparator with a signal Vs representing actual speed. An actuator responds to any error by adjusting the engine to bring the vehicle to the correct speed. Units are provided to enable the driver to increment or decrement the stored desired speed by small amounts (e.g. 0.5 miles per hour). By means of switches, he can switch into the memory either one of two preset desired speed values. He can also modify these present values, by feeding in, instead, the actual road speed of the vehicle, such modified preset values remaining until the engine is next switched off. The system incorporates a "SOFT OFF" feature, by which, under certain switch off modes of the system, the engine power is not shut off abruptly but at a controlled rate. The system is advantageously implemented by means of a microprocessor. The stored parameters can be arranged to be overwritten by alternative parameters stored in an EPROM.

25 Claims, 2 Drawing Sheets

AUTOMATIC SPEED CONTROL SYSTEMS

BACKGROUND OF THE INVENTION

The invention relates to automatic speed control systems, and more particularly to such speed control systems for automatically controlling the speed of a vehicle moving along the ground, such as a road vehicle, for example.

SUMMARY OF THE INVENTION

According to the invention, there is provided a vehicle speed control system for automatically controlling a vehicle to run at a selectable desired ground speed, comprising main memory means for storing a signal representing the desired speed, comparing means for comparing a signal representing the actual ground speed with the value of the stored signal so as to produce an error signal dependent on any difference between the compared speeds, output means responsive to the error signal for controlling the speed of the vehicle in dependence thereon so as to adjust its speed in a manner tending to reduce the error signal to zero, and driver-operable control means for applying a step change of predetermined value to the stored signal representing desired speed.

According to the invention, there is also provided a vehicle speed control system for controlling a vehicle to run at a selectable desired ground speed, comprising main memory means for storing a signal representing the desired speed, comparing means for comparing a signal representing the actual ground speed with the value of the stored signal so as to produce an error signal dependent on any difference between the compared speeds, output means responsive to the error signal for controlling the vehicle in dependence thereon so as to adjust its speed in a manner tending to reduce the error signal to zero, pre-set means storing at least one preset signal representing a predetermined value of desired ground speed, and driver-operable means for feeding this preset signal into the main memory means and storing it therein as the stored signal.

According to the invention, there is further provided a vehicle speed control system for automatically controlling a vehicle to run at a selectable desired ground speed, comprising main memory means for storing a signal representing the desired speed, comparing means for comparing a signal representing the actual ground speed with the value of the stored signal so as to produce an error signal dependent on any difference between the compared speeds, output means responsive to the error signal for controlling the power of the engine of the vehicle in dependence thereon so as to adjust the speed of the vehicle in a manner tending to reduce the error signal to zero, and disabling means for rendering the system inoperative to affect the power of the engine, the disabling means including smoothing means for reducing the power of the engine at a finite rate of predetermined value so as to avoid an immediate and abrupt reduction in actual ground speed.

According to the invention, there is still further provided a vehicle speed control system for automatically controlling a vehicle to run at a driver-selectable desired ground speed, comprising main memory means for storing a signal representing the desired ground speed, comparing means for comparing a signal representing the actual ground speed with the value of the stored signal so as to produce an error signal dependent on any difference between the compared speeds, output means responsive to the error signal for controlling the speed of the vehicle in dependence thereon so as to adjust its speed in a manner tending to reduce the error signal to zero, driver-operable setting means for bringing the system into operation by feeding into the main memory means, as the stored signal, a signal which changes in value so as to cause the output means to progressively increase the actual ground speed of the vehicle, feedback means for generating a signal representing the actual rate of acceleration of the vehicle, and means for comparing the feedback signal with a reference signal having a predetermined value representing a desired rate of acceleration of the vehicle whereby to alter the rate of change of value of the signal fed into the main memory means as necessary to maintain a desired acceleration of the actual vehicle ground speed.

The system is advantageously implemented by means of a microprocessor.

DESCRIPTION OF THE DRAWING

Automatic speed control systems embodying the invention will now be described, by way of example only, with reference to the accompanying drawings, FIG. 1A and 1B, which are a block diagram of one of the systems.

DESCRIPTION OF PREFERRED EMBODIMENTS

Figure 1A:
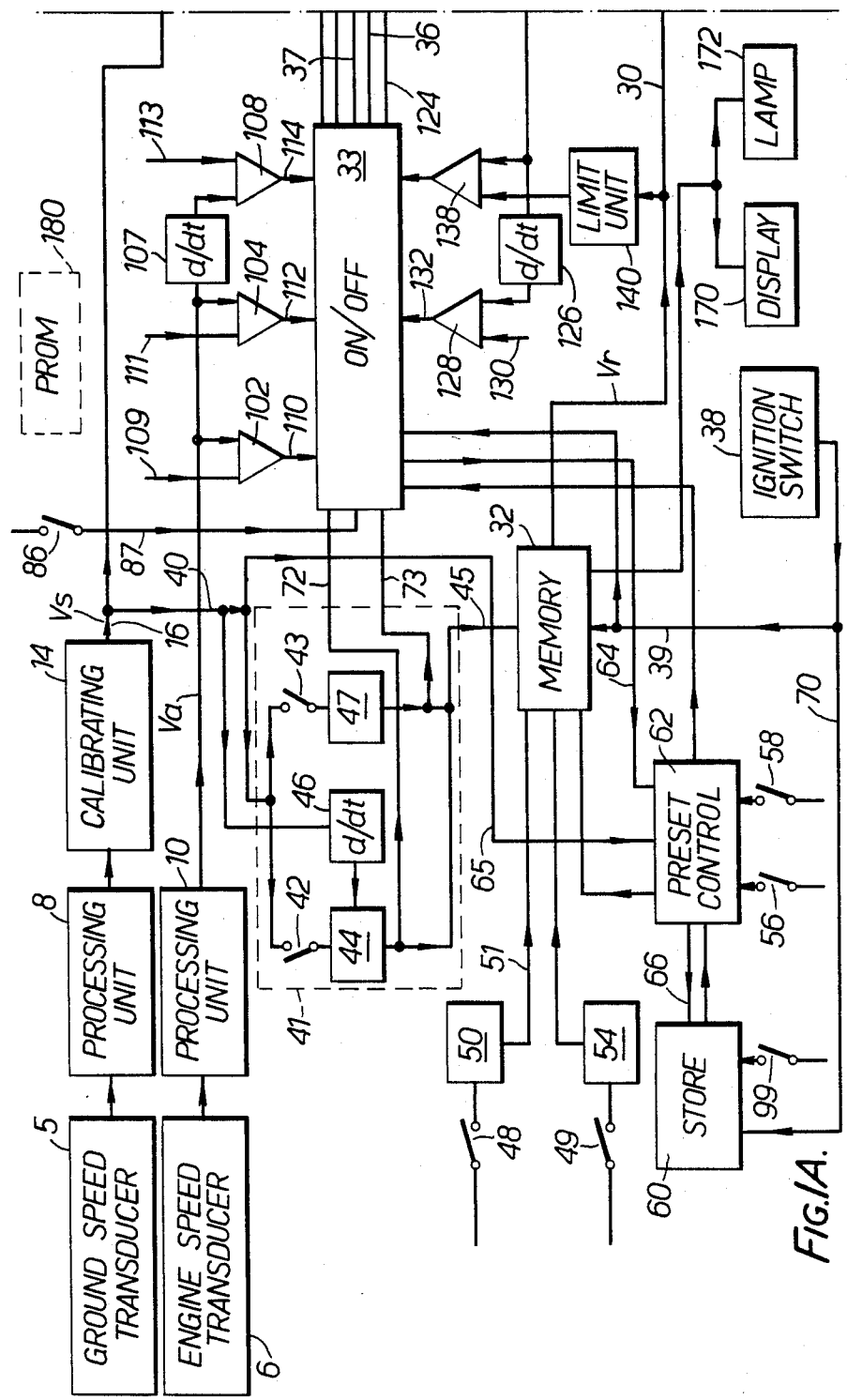
Figure 1B:
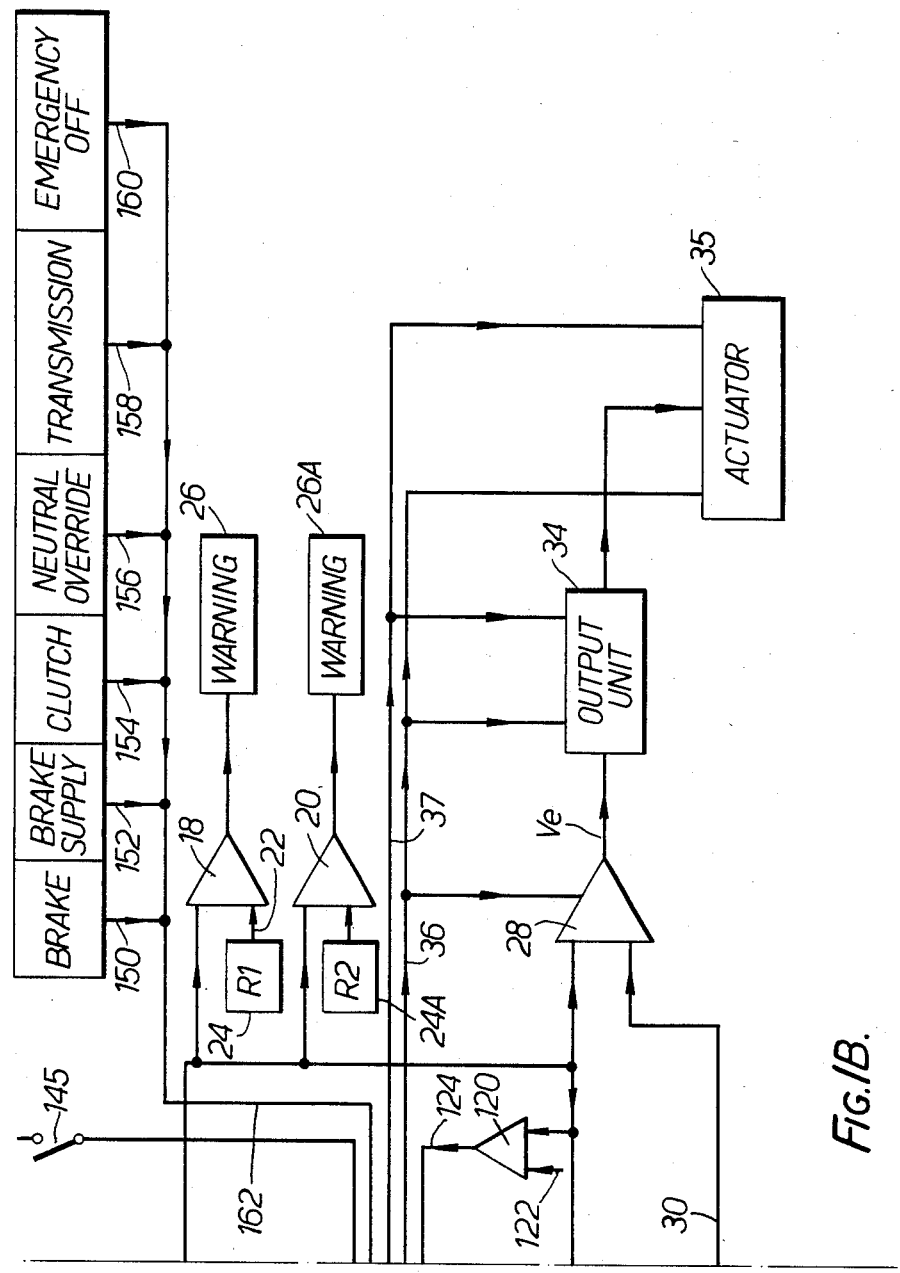

The system to be described with reference to FIGS. 1A and 1B is for automatically controlling the road speed of a road vehicle, primarily a light road vehicle such as an automobile. However, the system may also be applied to other road vehicles such as trucks and more specialist types of vehicle such as off the road vehicles. The system will in fact be described with particular reference to its application to a normal road vehicle in the form of an automobile powered by an internal combustion engine.

The system has a road speed transducer 5 and an engine speed transducer 6. These may take any suitable form so as to produce electrical output proportional to road and engine speed respectively. For example, the road speed transducer 5 may be in the form of an electromagnetic or optical type of transducer driven by the propellor shaft or drive shaft of the vehicle so as to provide magnetic or optical impulses at a rate proportional to the rotational speed of such shaft, such impulses being converted to electrical impulses. Instead, however, it could comprise a suitable take-off from the speedometer drive of the vehicle or from the actual speedometer itself. The latter is particularly suitable where the vehicle is fitted with an electronic speedometer.

The engine speed transducer may be driven by impulses derived from the ignition system of the vehicle engine.

In each case, the resultant speed-dependent electrical signals may be passed through respective processing units 8,10 which convert the electrical signals into a suitable form, such constant amplitude pulses at a rate proportional to the measured speed.

The signal dependent on road speed is fed on a line 12 to a calibrating unit 14. The purpose of the calibrating unit is to enable the signal to be scaled so that it is brought into a predetermined relationship with actual road speed according to the particular parameters of the vehicle, and the result is to produce a road speed-dependent signal Vs on a line 16.

The signal Vs is fed into one input of each of two comparators 18,20. Comparator 18 receives a reference R1 on a line 22 from a reference source 24 which represents a first preset speed. When Vs reaches the speed represented by this reference, comparator 18 energised an alarm unit 26 to signify this to the driver. Alarm unit 26 may be in the form of a warning light. Comparator 20 operates in similar fashion, its reference signal, R2, being derived from a reference source 24A, and the comparator operating a separate alarm unit 26A. The reference signals R1 and R2 may be pre-set when the system is set up so as to represent road speed limits appropriate to the country where the vehicle is to be used. For example, in the United Kingdom R1 could be set to represent 70 miles per hour (112 kilometers per hour) while reference R2 could be set to represent 40 miles per hour (68 kilometers per hour).

Signal Vs is also fed to comparator 28 which receives a second input on a line 30 from a memory 32. The memory stores a driver-controllable signal Vr representing the speed at which the driver desires the vehicle to run, and the signal Vr is output on line 30. The comparator 28 produces an error signal Ve in dependence on the sign and magnitude of any speed error between actual and desired vehicle speeds and this energises an output unit 34 which produces a corresponding drive signal for an actuator 35. Actuator 35 is connected to adjust the power of the vehicle engine in such a sense and by such an amount as to tend to reduce the error signal Ve to zero.

The state of the system is controlled by an ON/OFF unit 33. As will be explained, this unit receives a number of input signals from various parts of the system which control the state (ON or OFF) of the unit. When the unit 33 is switched to the OFF state it produces output signals which render the speed control system inoperative. When unit 33 is in the ON state, the system is enabled.

More specifically, when the ON/OFF unit 33 is in the OFF state, it produces "OFF" signals on a line 36 which switch the comparator 28, the output unit 34 and the actuator 35 off. A further signal on a line 37 may also be produced for controlling the switching off of the actuator 35 in a manner to be explained. The system is therefore brought out of operation. However, mere switching of the unit 33 into the OFF state does not clear any signals stored in the memory 32. When the ignition switch 38 of the vehicle is switched off, though, a signal on a line 39 completely clears the memory (and also switches the unit 33 OFF).

The signal stored in the memory may be derived from a number of sources. One of the inputs for the memory 32 is derived from the signal Vs via a line 40 and a setting unit 41. The setting unit 41 incorporates two parallel-connected driver-controlled switches 42 and 43. When closed, switch 42 feeds the signal Vs through an acceleration unit 44 which applies a predetermined rate of increase to signal Vs for so long as switch 42 is held closed. This increasing signal is fed into memory 32 on a line 45. When the driver releases switch 42, the memory stores the last value of the input signal. During this setting up process, the value of Vr will be increasing and the result will be an increase in Ve, causing acceleration of the vehicle.

In accordance with a feature of the system, the unit 44 receives a feedback signal from an acceleration measuring unit 46 and adjusts the predetermined rate of increase which it applies to its output to achieve a predetermined rate of vehicle acceleration. When switch 42 is released, the vehicle is thereafter controlled to run at the speed represented by the finally stored value of Vr.

Closure of switch 43 causes the signal Vs to be fed through a retarding unit 47 which applies a predetermined rate of decrease to the signal for so long as the switch 43 is held closed, and this decreasing signal is fed into the memory 32 on line 45. When the driver relases switch 43, the last value of this input signal is stored in memory 32.

Two further inputs for the memory are derived via driver-controlled switches 48 and 49.

Switch 48 enables the driver to actuate an incrementing unit 50 which, for each operation of switch 48, produces an incrementing signal on a line 51 which increases the value of the signal Vr in the memory 32. For example, it may increase Vr by an amount corresponding to 0.5 miles per hour (0.8 kilometers per hour).

Switch 49 operates a decrementing unit 54 which, for each operation of the switch, decreases the stored signal Vr by a like amount.

By means of switches 56 and 58, the driver can input respective preset values for Vr into the memory. These preset values may represent desired road speeds frequently used by the driver and signals representing them are stored in a store 60.

Closure of either of the switches 56 and 58 activates a preset control unit 62. If the ON/OFF unit 33 is in the OFF state, a resultant "OFF" signal on a line 64 from the unit 33 permits the unit 62 to respond by selecting the appropriate one of the pre-stored signals from the store 60, according to whether the switch 56 or the switch 58 is being operated, and this preset signal is fed into the memory 32. However, if the unit 33 is in the ON state, unit 62 is prevented from selecting either of these two pre-stored values. Independent of the state of the unit 33, switch 99 in conjunction with either switch 56 or switch 58 selects the current value of the signal Vs which it derives from line 40 via a line 65. The current speed is fed into the store 60 on a line 66 and now becomes the pre-stored speed corresponding to the particular one of the switches 56, 58 which has been operated. In other words, it will be this speed signal which will be fed into the memory 32 upon subsequent operations of that pre-set switch (provided that the ON/OFF unit 33 is in the OFF state). However, this modified preset signal only remains in the store 60 while the vehicle's ignition switch 38 remains ON. When the ignition is next turned off, a signal on a line 70 causes the values of any modified preset signals in the store 60 to be returned to the values of the permanently stored preset signals.

It will be apparent that the driver can bring the system into operation in a number of different ways.

For example, he can operate the switch 42 which will feed the signal Vs into the memory 32 and cause unit 44 to apply a constant rate of increase to that signal as explained. When the driver releases the switch 42, the vehicle will be controlled to run at the speed represented by the final value of Vr.

A corresponding action results from the driver's operation of switch 43, except that the vehicle decelerates to the finally set value of Vr instead of accelerating to that value.

In order for the system to be able to come into operation, it is necessary for unit 33 to be switched ON and this is achieved by means of line 72 or 73. These lines are energised by units 44 and 47 respectively.

It will be appreciated that momentary operation of switch 42 or switch 43 will cause the current value of Vs to be fed into memory 32 and stored therein as the desired value of Vr.

Alternatively, the driver can bring the system into operation by operating either of the switches 56 and 58 so as to store one of the preset values into the memory 32 as the signal Vr. A switch 86 has to be used to switch the unit 33 ON via a line 87 and the vehicle is then brought to the preset speed by the comparator 28 and held there.

A number of safety features are built into the system so as to render it inoperative under various different circumstances.

Thus, the unit 33 is switched off in the event of abnormal engine speed conditions. A signal Va on a line 100 is fed to each of two comparators 102 and 104 directly. It is also fed to a differentiating unit 107 which feeds a signal representing the rate of change of Va to a third comparator 108.

Comparator 102 compares the value of the signal Va with a reference signal received on a line 109 representing a low engine speed limit and produces a signal on a line 110 which switches the unit 33 OFF if the engine speed falls below this low limit. Comparator 104 receives a reference on a line 111 representing a high speed limit and produces a signal on a line 112 which switches the unit 33 OFF in the event of the engine exceeding this limit.

Finally, comparator 106 compares the rate of acceleration of the signal Va with a predetermined reference received on a line 113 and produces a signal on a line 114 which switches the unit 33 OFF if the rate of acceleration of the engine is too high. The comparators 102,104 and 108 thus prevent the operation of the speed control system from damaging the engine by causing it to run at an unusual speed. The unit 108 is primarily for protecting the engine against excessive overspeed: in the absence of the unit 108, it would be possible for the engine to accelerate so rapidly that comparator 104 could not switch the system off sufficiently quickly to prevent possible damage to the engine.

A comparator 120 compares the signal Vs representing actual road speed with a reference received on a line 122 representing a low rod speed limit (for example, 20 miles per hour or 32 kilometers per hour). If the road speed falls below this limit, comparator 120 produces a signal on a line 124 which switches the unit 33 OFF. Signal Vs is also fed through a differentiating unit 126 which produces a signal representing the rate of change (increase or decrease) of signal Vs which is fed to a comparator 128 which also receives a rate of change reference signal on a line 130. If the road speed of the vehicle is changing at more than the predetermined rate, a signal on a line 132 switches the unit 33 OFF.

Signal Vs is also fed to one input of a comparator 138. The other input of this comparator is fed with two limit signals derived from a limit unit 140 which receives the signal Vr. Unit 140 responds to signal Vr by producing signals which represent high and low speed limits respectively above and below the current desired speed by a predetermined amount (say, 10 miles per hour or 16 kilometers per hour). These limit signals therefore define a speed range extending above and below the desired speed, and if the actual speed falls outside this range, comparator 138 produces a signal on a line 142 which switches the unit 33 OFF. The limits generated by the unit 140 need not be symmetrically disposed relative to the desired speed. They could also, or instead, be arranged to vary with the desired speed so as, for example, to provide a wider range at higher speeds.

The unit 33 is also switched OFF by means of a signal on a line 144 when the ignition switch 38 is switched off.

The system is provided with a manual "off" or "COAST" switch 145 by means of which the driver can manually set the unit 33 to OFF, thus bringing the system out of operation (though without cancelling any signal stored in the memory 32).

The unit 33 may also be connected to be switched OFF in response to operation of various ones of the vehicle controls. For example, operation of the vehicle brakes can be arranged to generate an "off" signal on a line 150; a fault in the brake system (such as low level of hydraulic fluid) can be arranged to generate an "off" signal on a line 152; disengagement of the vehicle clutch can be arranged to generate an "off" signal on a line 154; placing of the vehicle transmission into neutral can be arranged to generate an "off" signal on a line 156; movement of the vehicle transmission out of a predetermined setting (for example, "Drive" in the case of an automatic transmission or the highest gear in the case of a manual transmission) can be arranged to generate an "off" signal on a line 158; and operation of an emergency stop button may be arranged to generate an "off" signal on a line 160. All these "off" signals are fed to the unit 33 on a channel 162 to switch it OFF. In practice, a particular installation would not have all such disabling means.

In accordance with a particular feature of the system, the rapidity with which the system is rendered inoperative can be varied according to the origin of the disabling signal. Thus, it is clearly desirable that "off" signals fed to the unit 33 on the channel 162 should switch the system off as rapidly as possible. However, such rapid off-switching will produce an abrupt deceleration of the vehicle speed (unless the driver should himself be maintaining the throttle open at the time of switch-off), and this may be unsatisfactory or undesirable under other circumstances, such as when the driver himself deliberately de-operates the system, as by using switch 145.

The unit 33 is therefore arranged under these conditions, to produce a "SOFT OFF" signal on the line 37. In response to this signal, the output unit 34 does not abruptly switch the actuator 35 to the minimum throttle setting but drives the actuator 35 smoothly towards that setting so as to provide a smooth (yet quite rapid) reduction of vehicle speed for at least a short predetermined period of time, whereafter the actuator 35 abruptly closes the throttle.

The driver may be provided with a digital display 170 of the actual speed represented by the stored signal Vr in the memory 32. The calibrating unit 14 ensures that the speed displayed is sufficiently accurately related to the true road speed which this signal represents. Instead, or in addition, a visual indicator 172 (for example a warning lamp) may be illuminated to indicate that a signal is in fact stored in the memory 32. The display unit 170 and the indicator 172 only produced outputs when the signals stored in the memory 32 represents a "usable" desired speed, that is, within the speed range over which the system is operative.

After the system has been de-operated by "OFF" outputs from unit 33, the driver may render it operative again by operating switch 86 which acts as a "RESUME" control. This switches the unit 33 ON. The system therefore controls the vehicle to run at the desired speed represented by the previously stored signal Vr. This assumes, of course that the ignition switch 38 has not been switched off (because this would clear the memory 32). Switch 86 may be a toggle-type switch which may initiate the "RESUME" facility if the unit 33 is OFF and, if unit 33 is ON, then it switches it OFF (replacing the function of switch 145).

The output unit 34 may be arranged to produce the control signal for driving the actuator by comparing the value of the error signal Ve with the value of a sawtooth waveform so as to produce a train of electrical pulses of constant amplitude but whose mark space ratio varies with the magnitude of the error signal. Such an arrangement is shown for example in our U.K. Pat. No. 1570887.

The actuator 35 may take any suitable form. It may, for example, be of pneumatic type such as energised from the negative pressure generated in the inlet manifold of the vehicle engine. Such an actuator is described, for example, in our U.K. Pat. No. 1486822. Instead, however, it could take the form of an electric motor-driven actuator such as the actuator disclosed in United Kingdom patent specification No. 2165917. That specification discloses an actuator in the form of an electric motor whose output drives through two epicyclic reduction gear stages so as to produce reduced rotational speed of an output shaft which is connected to operate the engine throttle through a cable link. The actuator includes an electromagnetic clutch which, when disengaged, completely halts the rotation of the output shaft. The clutch operates by controlling the braking of the annulus gear of the second epicyclic unit.

If such an actuator is used in the system under discussion, the normal "OFF" output on line 36 from the ON/OFF unit 33 may be arranged to cause the output unit 34 to disengage the clutch so as substantially instantaneously to remove the drive to the output shaft of the actuator motor, whereupon the spring bias returns this shaft, and the throttle cable, to the minimum speed setting. This action of course provides an abrupt closure of the engine throttle, as desired. However, when the "SOFT OFF" output is produced on line 37, this may be arranged to cause the output unit 34 to maintain the clutch engaged for at least a short period of time (e.g. several seconds) during which the electric motor of the actuator is energised so as to drive the output shaft of the actuator in such a direction as to close the throttle rapidly (but not abruptly). After this short period of time, the clutch is then disengaged so as to close the throttle abruptly.

Even in the circumstances when the output unit 33 produces the normal "OFF" signal, this may be arranged not only to disengage the actuator clutch as already explained but also to drive the electric motor of the actuator very rapidly to the throttle-closing position. The purpose of this is to provide an increased safety factor: if any malfunction in the actuator should prevent the clutch from disengaging properly, the throttle will nevertheless be closed by the motor.

The system described may be implemented directly by means of hardware. Instead, however, the system may use a microprocessor which responds to the various inputs—the road speed and engine speed inputs and the control signals from the driver-controlled switches and from the vehicle driving controls—by producing the control signal for controlling the actuator 34 and for operating the various displays and indicators. The microprocessor will thus be programmed with various parameters according to the particular installation: for example, the various reference inputs defining the references R1 and R2, the limit speeds and limits for rate of speed change, the speed increments implemented by the units 50 and 54, and the values of the pre-set speeds in the store 60.

Advantageously, however, the microprocessor can be arranged to respond to a different set of parameters if desired, by means of a separate memory unit 180 which may, for example, be in the form of a PROM, for example an EPROM. This PROM is connected to the microprocessor and stores a number of alternative parameters which are automatically fed into the microprocessor and overwrite the parameters stored therein. This provides a convenient means of modifying the operation of a particular system without re-programming the microprocessor. For example, the microprocessor may be pre-programmed for a system designed to fit a particular type of vehicle in its main area of operation (that is, the main area or country in which it is expected to be sold and used). When that vehicle is sold into other countries, however, it may be necessary to modify some of the parameters so as to suit local speed limits etc., Such modification can be easily effected by means of the PROM. It is not necessary to provide a separately programmed microprocessor for that particular field of application.

What is claimed is:

1. A vehicle speed control system for controlling a vehicle to run at a selectable desired ground speed, comprising
    main memory means for storing a signal representing the desired speed.
    comparing means connected to the main memory means and to receive an actual speed signal representing the actual ground speed and operative to compare the actual speed signal with the value of the stored signal so as to produce an error signal dependent on any difference between the compared signals,
    output means responsive to the error signal for controlling the vehicle in dependence thereon so as to adjust its speed in a manner tending to reduce the error signal to zero,
    subsidiary memory means storing at least one preset signal representing a predetermined value of desired ground speed, driver-operable means connected to the subsidiary memory means and operative to feed this preset signal from the subsidiary memory means into the main memory means and storing it in the main memory means as the stored signal, and
    driver-operable adjusting means connected to the subsidiary memory means for providing a temporary change in the value for the preset signal stored therein.

2. A system according to claim 1, in which the driver-operable adjusting means comprises means for selecting as the temporary value for the preset signal a signal representing the current ground speed of the vehicle.

3. A system according to claim 1, including means responsive to switch-off of the vehicle engine to cancel the temporary value for the preset signal.

4. A system according to claim 3, including disabling means for rendering the system inoperative to affect the power of the engine.

5. A system according to claim 4, in which the disabling means includes means responsive to the actual speed of the engine of the vehicle, independently of the ground speed of the vehicle, for rendering the system inoperative if the engine speed exceeds a maximum speed of predetermined value.

6. A system according to claim 5, in which the disabling means includes means for rendering the system inoperative if the rate of acceleration of the actual engine speed, independently of the ground speed of the vehicle, exceeds a rate of predetermined value.

7. A system according to claim 5, in which the disabling means includes means responsive to the actual speed of the engine of the vehicle, independently of the ground speed of the vehicle, for rendering the system inoperative if the engine speed falls below a low limit of predetermined value.

8. A system according to claim 4, in which the disabling means comprises means responsive to the actual ground speed of the vehicle for rendering the system inoperative if the actual ground speed falls outside a limit of predetermined value.

9. A system according to claim 4, in which the disabling means comprises means responsive to the actual ground speed of the vehicle for rendering the system inoperative if the actual ground speed is changing at more than a rate of predetermined value.

10. A system according to claim 4, in which the disabling means comprises means responsive to the actual ground speed of the vehicle and to the desired speed of the vehicle for rendering the system inoperative if the actual ground speed falls outside a limit whose value is dependent on the value of the desired speed.

11. A system according to claim 4, including smoothing means responsive to the disabling means for rendering the system inoperative by reducing the power of the engine at a finite rate of predetermined value so as to avoid an immediate and abrupt reduction in actual ground speed.

12. A system according to claim 11, in which the smoothing means reduces the engine power at the said finite rate for a period of time of predetermined value only and then abruptly reduces the engine power.

13. A system according to claim 3, including means responsive to the actual ground speed of the vehicle to provide a warning indication to the driver when the actual ground speed exceeds at least one reference speed of predetermined value.

14. A system according to claim 3, including an indicator operative to provide an indication to the driver of a signal stored in the memory means representing a desired speed for the vehicle.

15. A system according to claim 14, in which the indicator means comprises means for indicating to the driver the actual value of the desired speed represented by the stored signal.

16. A system according to claim 1, in which the output means includes
an actuator having an electric motor driven in dependence on the value of the said error signal,
an output member responsive to energisation of the electric motor for adjusting the power of the engine of the vehicle, and
clutch means for connecting the electric motor to and disconnecting it from the output member.

17. A system according to claim 16, including
disabling means for rendering the system inoperative to affect the power of the engine,
smoothing means responsive to the disabling means for reducing the power of the engine at a finite rate of predetermined value for a period of time of predetermined value so as to avoid an immediate and abrupt reduction in actual ground speed, the smoothing means being operative to abruptly reduce the engine power at the end of the said period of time,
the said smoothing means comprising means for energising the electric motor so that it drives the output member in a sense to reduce the power of the engine of the vehicle at the said finite rate, and means operative at the end of the said period of time to disengage the clutch.

18. A system according to claim 1, in which the said signals are digital signals.

19. A system according to claim 18, implemented by means of a programmed microprocessor.

20. A system according to claim 19, in which the microprocessor implements the functions of the main memory means and the comparing means and the other said means except the driver-operable means and the output means.

21. A system according to claim 19, in which the microprocessor is pre-programmed with the said predetermined value.

22. A system according to claim 21, including an auxiliary unit storing an alternative value for the said predetermined value and means for controlling the operation of the microprocessor in dependence on this alternative value.

23. A vehicle speed control system for automatically controlling a vehicle to run at a driver-selectable desired ground speed, comprising
main memory means for storing a signal representing the desired ground speed,
comparing means connected to the main memory means and to receive an actual speed signal representing the actual ground speed and operative to compare the actual speed signal with the value of the stored signal so as to produce an error signal dependent on any difference between the compared speeds,
output means responsive to the error signal for controlling the speed of the vehicle in dependence thereon so as to adjust its speed in a manner tending to reduce the error signal to zero,
driver-operable setting means for bringing the system into operation by feeding into the main memory means, as the stored signal, a signal which changes in value so as to cause the output means to progressively increase the actual ground speed of the vehicle,
feedback means for generating a signal representing the actual rate of acceleration of the vehicle, and
means for comparing the feedback signal with a reference signal having a predetermined value representing a desired rate of acceleration of the vehicle whereby to alter the rate of change of value of the signal fed into the main memory means as necessary to maintain a desired acceleration of the actual vehicle ground speed.

24. A vehicle speed control system for automatically controlling a vehicle to run at a selectable desired ground speed, comprising main memory means for storing a signal representing the desired speed, comparing means connected to the main memory means and to receive an actual speed signal representing the actual ground speed and operative to compare the actual speed signal with the value of the stored signal so as to produce an error signal dependent on any difference between the compared speeds, output means responsive to the error signal for controlling the power of the engine of the vehicle in dependence thereon so as to adjust the speed of the vehicle in a manner tending to reduce the error signal to zero, and disabling means for rendering the system inoperative to affect the power of the engine, including smoothing means for reducing the power of the engine at a finite rate of predetermined value so as to avoid an immediate and abrupt reduction in actual ground speed.

25. A system according to claim 24, in which the smoothing means reduces the engine power at the said finite rate for a predetermined time of predetermined value only and then abruptly reduces the engine power.

* * * * *